US012432500B2

(12) United States Patent
Muta et al.

(10) Patent No.: US 12,432,500 B2
(45) Date of Patent: Sep. 30, 2025

(54) SPEAKER MAGNETIC CIRCUIT AND SPEAKER DRIVER

(71) Applicant: FOSTER ELECTRIC COMPANY, LIMITED, Tokyo (JP)

(72) Inventors: Yusuke Muta, Tokyo (JP); Haijiao Han, Tokyo (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 208 days.

(21) Appl. No.: 18/278,072

(22) PCT Filed: Feb. 8, 2022

(86) PCT No.: PCT/JP2022/004953
§ 371 (c)(1),
(2) Date: Aug. 21, 2023

(87) PCT Pub. No.: WO2022/181316
PCT Pub. Date: Sep. 1, 2022

(65) Prior Publication Data
US 2024/0056740 A1 Feb. 15, 2024

(30) Foreign Application Priority Data
Feb. 26, 2021 (JP) ................................ 2021-030902

(51) Int. Cl.
*H04R 9/02* (2006.01)
*H04R 7/18* (2006.01)
(Continued)

(52) U.S. Cl.
CPC ............... *H04R 9/025* (2013.01); *H04R 7/18* (2013.01); *H04R 9/06* (2013.01); *H04R 7/04* (2013.01)

(58) Field of Classification Search
None
See application file for complete search history.

(56) References Cited

U.S. PATENT DOCUMENTS

2005/0152573 A1* 7/2005 Suzuki .................. H04R 9/025 381/412
2006/0188120 A1* 8/2006 Fisher .................... H04R 9/025 381/396
(Continued)

FOREIGN PATENT DOCUMENTS

JP 48-022537 U1 3/1973
JP 50-038728 U1 4/1975
(Continued)

OTHER PUBLICATIONS

International Search Report and Written Opinion for Application No. PCT/JP2022/004953, dated Apr. 12, 2022.
(Continued)

*Primary Examiner* — Antim G Shah
(74) *Attorney, Agent, or Firm* — MARSHALL, GERSTEIN & BORUN LLP

(57) ABSTRACT

The speaker magnetic circuit includes a yoke cover that is formed from a tubular magnetic body with a diaphragm attachable to an end portion on an axial direction one-side, a magnet arranged at an inside of the yoke cover, a volume adjusting member that is formed from a tubular non-magnetic body, that is provided between the yoke cover and the magnet, and that is formed with a first groove extending in the axial direction, and a yoke base that is formed from a magnetic body, that is provided at an axial direction other-side of the magnet, and that is also formed with a second groove at a position corresponding to the first groove. The first groove and the second groove configure a duct portion that communicates a space inside the yoke cover at the axial direction one-side with a space at the axial direction other-side therein.

6 Claims, 7 Drawing Sheets

(51) Int. Cl.
*H04R 9/06* (2006.01)
*H04R 7/04* (2006.01)

(56) References Cited

U.S. PATENT DOCUMENTS

| | | | | |
|---|---|---|---|---|
| 2008/0056528 | A1 | 3/2008 | Yano et al. | |
| 2020/0221214 | A1* | 7/2020 | Mordechai | H04R 7/18 |

FOREIGN PATENT DOCUMENTS

| | | | |
|---|---|---|---|
| JP | S57-204795 | U | 12/1982 |
| JP | 58-152089 | U1 | 10/1983 |
| JP | 2006-217452 | A | 8/2006 |
| JP | 2012-039353 | A | 2/2012 |
| WO | WO-2020/218042 | A1 | 10/2020 |

OTHER PUBLICATIONS

Notice of Reasons for Refusal issued in Japanese Patent Application No. 2023-502258 dated Jun. 24, 2025.

* cited by examiner

SPEAKER MAGNETIC CIRCUIT AND SPEAKER DRIVER

TECHNICAL FIELD

The present disclosure relates to a speaker magnetic circuit and a speaker driver.

BACKGROUND ART

An electroacoustic transducer that includes a diaphragm connected to a voice coil and cylinder shaped magnet having a larger diameter than the voice coil is disclosed in International Publication (WO) No. 2020/218042. A micro-speaker having a magnet disposed inside a yoke formed in a circular cylinder shape is disclosed in Japanese Patent Application Laid-Open (JP-A) No. 2012-39353.

SUMMARY OF INVENTION

Technical Problem

A ring shaped magnet is employed in an external magnet structure in which a magnet is disposed outside, as in the electroacoustic transducer as described in WO No. 2020/218042, and so this makes it difficult to achieve a compact magnetic circuit. Although an internal magnet structure in which a magnet is disposed inside a yoke, as in the micro-speaker described in JP-A No. 2012-39353, is easily made compact, securing magnetic flux density and adjusting frequency characteristics therein is difficult.

An object of the present disclosure is to provide a speaker magnetic circuit and a speaker driver that enable magnetic flux density to be secured and frequency characteristics to be adjusted in an internal magnet structure.

Solution to Problem

A speaker magnetic circuit according to a first aspect includes a yoke cover that is formed from a tubular magnetic body with a diaphragm attachable to an end portion on an axial direction one-side; a magnet arranged at an inside of the yoke cover; a volume adjusting member that is formed from a tubular non-magnetic body, that is provided between the yoke cover and the magnet, and that is formed with a first groove extending in an axial direction; and a yoke base that is formed from a magnetic body, that is provided at an axial direction other-side of the magnet, and that is formed with a second groove at a position corresponding to the first groove, wherein: the first groove and the second groove configure a duct portion that communicates a space inside the yoke cover at the axial direction one-side with a space at the axial direction other-side therein.

In the above aspect, the yoke cover is formed from the tubular magnetic body and a diaphragm is attachable to the axial direction one-end portion of the yoke cover. Moreover, the magnet is arranged at the inside of the yoke cover and configures a magnetic circuit between the magnet and the yoke cover. The yoke base formed from the magnetic body is also provided at the axial direction other-side of the magnet. This thereby enables the magnetic flux density of the magnetic circuit to be raised.

The volume adjusting member is provided between the yoke cover and the magnet. The volume adjusting member is formed from the tubular non-magnetic body, and the first groove is formed to the volume adjusting member so as to extend in the axial direction. The second groove is formed to the yoke base at a position corresponding to the first groove, and the duct portion is configured by the first groove and the second groove. The space at the axial direction one-side of the magnet is communicated through the duct portion with the space at the axial direction other-side thereof, and so air at a periphery of the diaphragm is accordingly able to move through the duct portion to the outside of the yoke base when the diaphragm vibrates, thereby enabling damping of frequency characteristics to be adjusted. Note that reference here to the "first groove" is not limited to an indentation shaped portion formed so as to indent a portion of the volume adjusting member, and is broadly defined to include a slit shaped portion.

A speaker magnetic circuit according to a second aspect is the first aspect, wherein the volume adjusting member extends in the axial direction, from an axial direction one-end portion of the yoke cover to the yoke base, so as to fill a gap between the magnet and the yoke cover.

In the above aspect, the volume adjusting member extends in the axial direction as far as the yoke base, and so this thereby enables the volume inside the yoke cover to be adjusted merely by changing the shape and/or size of the first groove, enabling easy adjustment of the lowest resonance frequency (F0). For example, a volume at the inside of the yoke cover can be reduced by adjusting the size of the first groove of the volume adjusting member. As a result this enables the lowest resonance frequency (F0) to be suppressed from becoming lower.

A speaker magnetic circuit according to a third aspect is the first aspect or the second aspect, wherein a projection portion is provided at the volume adjusting member so as to project from an axial direction other-end portion thereof toward a yoke base side; and an engagement indentation for engaging with the projection portion is formed to the yoke base.

In the above aspect, the projection portion formed to the volume adjusting member engages with the engagement indentation formed to the yoke base, and this accordingly enables relative movement between the volume adjusting member and the yoke base to be suppressed even without fixing these two components together with a means such as bonding or the like. This thereby enables a state of alignment between the positions of the first groove formed to the volume adjusting member and the second groove formed to the yoke base to be maintained.

A speaker magnetic circuit according to a fourth aspect is any one of the first aspect to the third aspect, wherein a yoke top formed from a magnetic body with a smaller diameter than a diameter of the magnet is provided at an axial direction one-side of the magnet; and the volume adjusting member includes a ring shaped portion that is formed in a ring shape and is able to support the yoke top from a radial direction outer side, and a side wall portion that extends from a peripheral end portion of the ring shaped portion toward an axial direction other-side and that is able to support the magnet from the radial direction outer side.

In the above aspect, the ring shaped portion of the volume adjusting member supports the yoke top, and the side wall portion of the volume adjusting member supports the magnet, thereby enabling the central axes of the yoke top and the magnet to be suppressed from displacing. Namely, positioning between the yoke top and the magnet can be performed by the volume adjusting member for adjusting the volume without providing a separate member for positioning.

A speaker magnetic circuit according to a fifth aspect is the fourth aspect, wherein the yoke cover includes a top face portion abutted by the ring shaped portion of the volume adjusting member, and a side wall portion that extends in the axial direction from a peripheral end portion of the top face portion and that covers the volume adjusting member from the radial direction outside; and the top face portion is formed with an opening portion through which the yoke top is inserted, and with an upstand portion that projects from an opening edge of the opening portion further toward the axial direction one-side than the yoke top.

In this aspect, the volume adjusting member can be positioned by abutting the ring shaped portion of the volume adjusting member against the top face portion of the yoke cover. The yoke top is inserted through the opening portion of the top face portion, and the upstand portion formed to the opening edge of the opening portion projects further toward the axial direction one-side than the yoke top. Magnetic field lines accordingly pass obliquely from the yoke top toward the upstand portion, enabling the magnetic flux density of the magnetic circuit to be raised at the position of the coil arranged between the yoke top and the yoke cover. The yoke top and the yoke cover can be positioned in the axial direction by the volume adjusting member, thereby enabling the magnetic field lines to flow in a desired direction.

A speaker driver according to a sixth aspect includes the speaker magnetic circuit of any one of the first aspect to the fifth aspect, a diaphragm provided at an axial direction one-end portion of the yoke cover; and a coil that is attached to the diaphragm and that causes the diaphragm to vibrate by current being passed through the coil.

In the above aspect, the air at the inside of the yoke base moves through the duct portion when the diaphragm is vibrated. This thereby enables adjustment of frequency characteristics to be performed easily.

The speaker magnetic circuit and the speaker driver of the present disclosure enable magnetic flux density to be secured and frequency characteristics to be adjusted in an internal magnet structure.

DESCRIPTION OF EMBODIMENTS

Explanation follows regarding a speaker driver 10 according to an exemplary embodiment, with reference to the drawings. Note that Z in FIG. 1 indicates an axial direction one-direction of the speaker driver 10. In the following description the Z direction side will be referred to as an axial direction one-side. Moreover, the opposite side to the Z direction will be referred to as an axial direction other-side.

Speaker Driver 10 Overall Configuration

Figure 1:
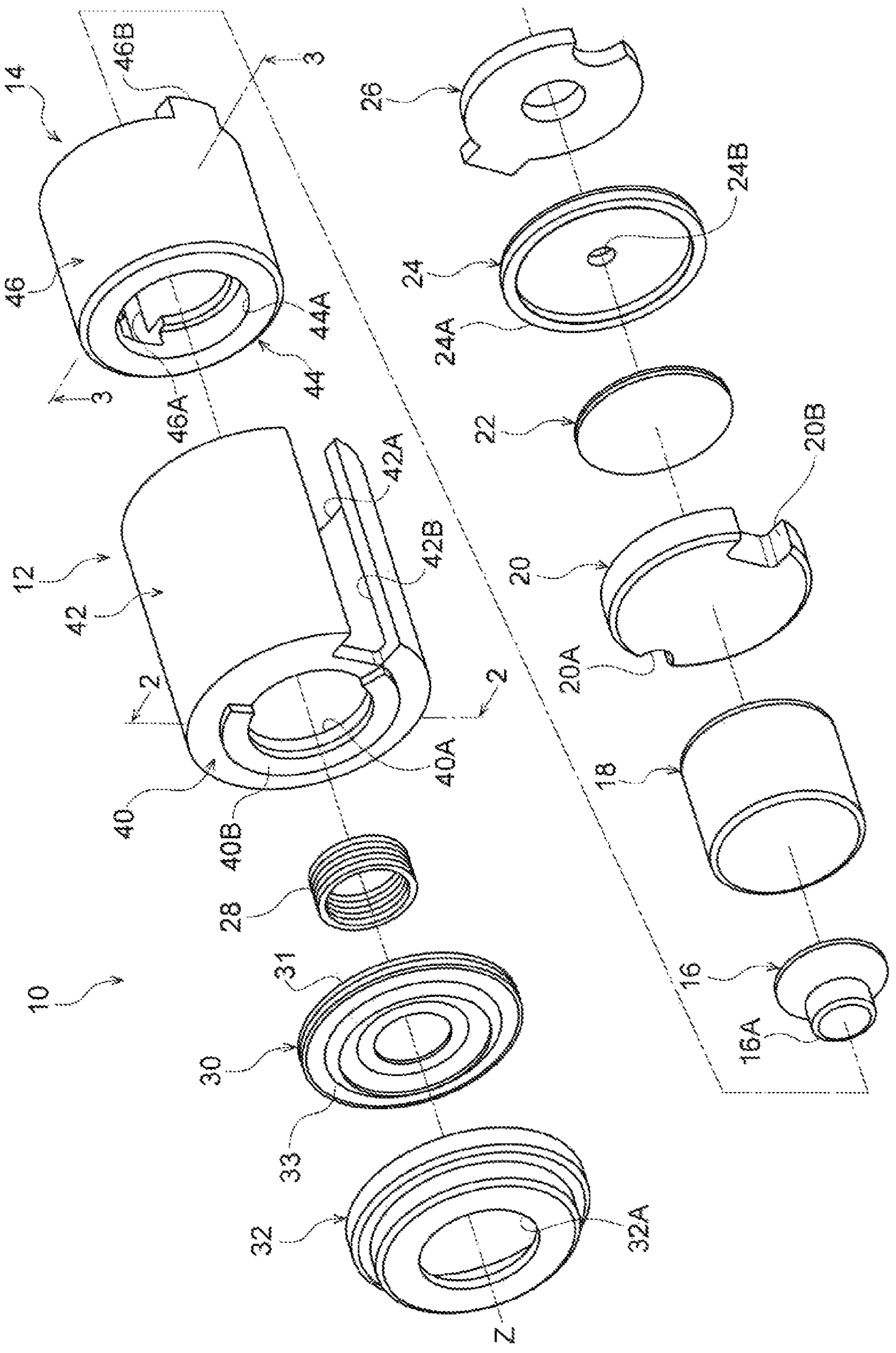
FIG. 1 is an exploded perspective view of a speaker driver according to an exemplary embodiment.
Figure 2:
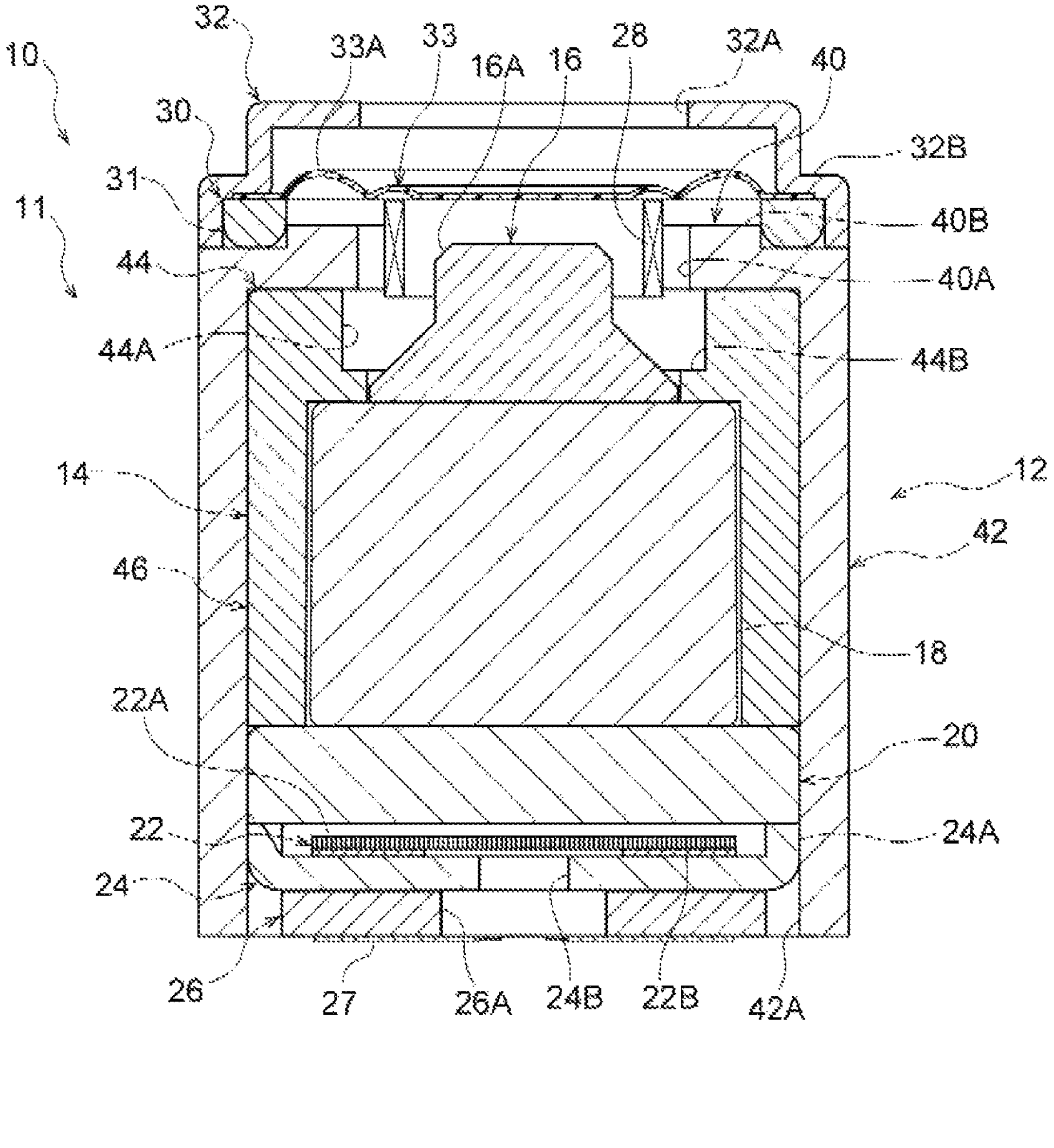
FIG. 2 is a cross-section illustrating a speaker driver in a state sectioned along line 2-2 of FIG. 1.

As illustrated in FIG. 1, the speaker driver 10 of the present exemplary embodiment (hereafter referred to as "driver 10" as appropriate) is configured including a yoke cover 12, a volume adjusting member 14, a yoke top 16, a magnet 18, a yoke base 20, a screen 22, a metal plate 24, a terminal 26, a coil 28, a diaphragm unit 30, and a lid member 32. In the present exemplary embodiment, as illustrated in FIG. 2, a speaker magnetic circuit 11 (hereafter referred to as "magnetic circuit 11" as appropriate) is configured by the yoke cover 12, the volume adjusting member 14, the yoke top 16, the magnet 18, and the yoke base 20. The driver 10 of the present exemplary embodiment is, for example, employed in a speaker installed to an earphone, headphone, or the like. Moreover, the driver 10 of the present exemplary embodiment is, as an example, a compact driver having a diameter of about 4 mm.

As illustrated in FIG. 1, the yoke cover 12 is formed from a tubular shaped magnetic body, and is a substantially circular cylinder shape open at the two axial direction end sides thereof. Details regarding the yoke cover 12 will be described later.

The volume adjusting member 14 is a tubular shaped member arranged inside the yoke cover 12, and is formed from a non-magnetic body. The volume adjusting member 14 of the present exemplary embodiment is, as an example, formed by a metal member having aluminum as a main component. The volume adjusting member 14 is configured including a ring shaped portion 44 formed in a substantially ring shape, and a side wall portion 46 extending from a peripheral end portion of the ring shaped portion 44 toward the axial direction other-side (opposite side to the Z direction). Details regarding the volume adjusting member 14 will be described later.

The yoke top 16 and the magnet 18 are arranged at the inside of the volume adjusting member 14. As illustrated in FIG. 2, the magnet 18 is formed in a substantially circular pillar shape, and the magnet 18 of the present exemplary embodiment is, as an example, configured by a neodymium magnet having an axial direction length of about 2 mm.

The yoke top 16 is arranged at the axial direction one-side of the magnet 18. The yoke top 16 is formed from a magnetic body in a shape that combines a truncated cone with a circular pillar, with the truncated cone shaped portion abutting a face of the magnet 18 on the axial direction one-side. The axial direction length of the yoke top 16 is shorter than that of the magnet 18, and the external diameter of the yoke top 16 is a smaller diameter than that of the magnet 18. In other words, the magnet 18 is formed longer in the axial direction than the yoke top 16, and is formed with a larger diameter than that of the yoke top 16. A beveled portion 16A is moreover formed to the yoke top 16 by beveling an axial direction one-end portion thereof.

As illustrated in FIG. 1, the yoke base 20 is arranged at the axial direction other-side of the magnet 18. The yoke base 20 is formed from a magnetic body in a substantially circular flattened pillar shape, with the axial direction length of the yoke base 20 being about 0.6 mm. The yoke base 20 is formed with a larger diameter than that of the magnet 18, and has an external diameter that is about the same as that of the volume adjusting member 14. Details regarding the yoke base 20 will be described later.

The screen 22 is arranged at an axial direction other-side of the yoke base 20. As illustrated in FIG. 2, the screen 22 is formed with a smaller diameter than that of the yoke base 20, and is configured including a substantially circular shaped mesh member 22A and a ring shaped support member 22B that supports the mesh member 22A. The mesh member 22A is a member formed with plural air holes communicating air between the front and back sides thereof, and is, for example, formed by a film formed with multiple through holes. Alternatively, the mesh member 22A may be formed by a member such as a non-woven fabric or urethane foam. The support member 22B of the screen 22 is, for example, formed by double-sided tape, and is attached to the metal plate 24.

As illustrated in FIG. 1, the metal plate 24 is formed from a non-magnetic body such as stainless steel or the like in a substantially flat plate shape having a larger diameter than that of the screen 22. A peripheral wall portion 24A extends from an outer peripheral end portion of the metal plate 24 toward the axial direction one-side. As illustrated in FIG. 2, the peripheral wall portion 24A is fitted to an inner face of a side wall portion 42 of the yoke cover 12 so as to abut the yoke base 20, with the height of the peripheral wall portion 24A higher than a thickness of the screen 22. This means that a space to arrange the screen 22 is secured between the metal plate 24 and the yoke base 20. Furthermore, an air hole 24B is formed in a central portion of the metal plate 24, with the inside and the outside of the driver 10 in communication through the air hole 24B.

The terminal 26 is attached to a face on the axial direction other-side of the metal plate 24. The terminal 26 is formed in a substantially circular plate shape, with a communication hole 26A that is formed in a central portion of the terminal 26 communicating with the air hole 24B of the metal plate 24. An electrode 27 is provided on an axial direction other-side face of the terminal 26, and a non-illustrated lead wire extending from the coil 28 is connected to the electrode 27.

The coil 28 and the diaphragm unit 30 are arranged at the axial direction one-side of the yoke cover 12. As illustrated in FIG. 1, the coil 28 is formed by winding an electrical wire in a circular cylinder shape, with the external diameter of the coil 28 being a smaller diameter than that of the magnet 18. The coil 28 is attached to the diaphragm unit 30.

As illustrated in FIG. 2, the diaphragm unit 30 is configured including a support ring 31 and a diaphragm 33. The support ring 31 is formed in a substantially circular ring shape, and is clamped between the lid member 32 and the yoke cover 12. The diaphragm 33 is attached to the axial direction one-side of the support ring 31, and the coil 28 is fixed to an axial direction other-side face of the diaphragm 33.

A central portion of the diaphragm 33 is formed in a substantially flat plate shape, and an edge portion 33A is formed to an outer peripheral portion of the diaphragm 33 so as to bulge out toward the axial direction one-side. The coil 28 is moved in the axial direction by passing current through the coil 28, in a configuration such that the diaphragm 33 vibrates along with this movement.

The lid member 32 is arranged at the axial direction one-side of the diaphragm unit 30. The lid member 32 is formed from a non-magnetic body such as stainless steel, aluminum, or the like in a substantially circular cylinder shape. An opening portion 32A is formed in a central portion of the lid member 32, with sound generated by vibration of the diaphragm 33 output to outside the driver 10 through the opening portion 32A.

The lid member 32 is formed with a larger diameter at the axial direction other-side than at the axial direction one-side, and the diaphragm unit 30 is sandwiched against the yoke cover 12 by a step portion 32B between a small diameter portion and a larger diameter portion thereof. Furthermore, an axial direction other-end portion of the lid member 32 is attached to the yoke cover 12.

Magnetic Circuit 11 Configuration

Next, detailed description follows regarding a configuration of the speaker magnetic circuit 11, which is a relevant portion of the present disclosure. The speaker magnetic circuit 11 is configured including the yoke cover 12, the volume adjusting member 14, the yoke top 16, the magnet 18, and the yoke base 20.

As illustrated in FIG. 2, the yoke cover 12 is configured including a top face portion 40 abutted by the ring shaped portion 44 of the volume adjusting member 14, and the side wall portion 42 that extends from a peripheral end portion of the top face portion 40 toward the axial direction other-side, and that covers the volume adjusting member 14 from the radial direction outside. An opening portion 40A is formed in a central portion of the top face portion 40, with a leading end portion of the yoke top 16 and the coil 28 inserted into the opening portion 40A.

The side wall portion 42 extends in the axial direction as far as the position of the terminal 26, with an end face on the axial direction other-side of the side wall portion 42 substantially flush with an end face on the axial direction other-side of the terminal 26. An opening portion 42A is formed in an axial direction other-end portion of the side wall portion 42, with components such as the volume adjusting member 14, the magnet 18, the yoke base 20, the metal plate 24, and the terminal 26 arranged at the inside of the yoke cover 12 through the opening portion 42A.

Figure 3:
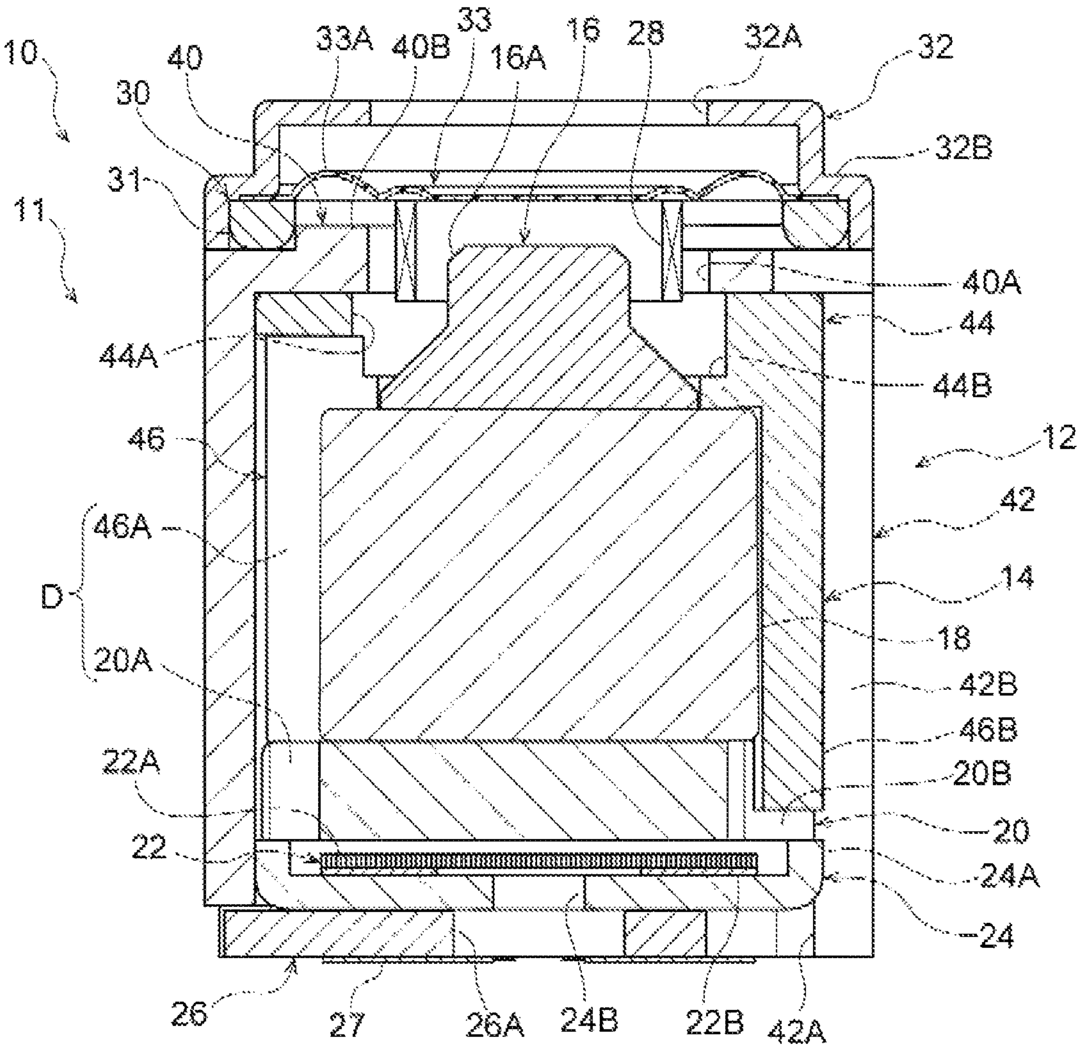
FIG. 3 is a cross-section illustrating a speaker driver in a state sectioned along line 3-3 of FIG. 1.

As illustrated in FIG. 1 and FIG. 3, a cut out portion 42B is formed in the side wall portion 42 in a shape cut out along the axial direction from an axial direction one-end portion to an axial direction other-end portion of the yoke cover 12. The cut out portion 42B is formed contiguously as far as the top face portion 40, and a non-illustrated lead wire connecting the terminal 26 and the coil 28 together passes through the cut out portion 42B.

An upstand portion 40B is formed to an opening edge of the opening portion 40A of the top face portion 40 so as to project out toward the axial direction one-side. The upstand portion 40B is formed in a substantially circular arc shape as viewed along the axial direction, and is formed up to just before where the cut out portion 42B is formed to the side wall portion 42. Moreover, as illustrated in FIG. 2, the upstand portion 40B projects out further toward the axial direction one-side than the yoke top 16, in a configuration in which magnetic field lines are oriented obliquely from a vicinity of the beveled portion 16A that is the leading end portion of the yoke top 16 toward the upstand portion 40B.

As stated above, the volume adjusting member 14 is configured including the ring shaped portion 44 and the side wall portion 46, with the axial direction one-side of the ring shaped portion 44 abutted against the top face portion 40 of the yoke cover 12. An opening portion 44A having a slightly larger diameter than that of the opening portion 40A of the yoke cover 12 is formed to a central portion of the portion 44, with the opening portion 44A communicating with the opening portion 40A of the yoke cover 12. Furthermore, a projection portion 44B projects out from an inner peripheral face of the ring shaped portion 44 toward the radial direction inside, with an inner diameter of the axial direction other-end portion of the opening portion 44A being a smaller diameter than the inner diameter at the axial direction one-end portion due to the presence of this projection portion 44B. The projection portion 44B is configured so as to be able to support the yoke top 16 from the radial direction outside.

The side wall portion 46 extends from a peripheral end portion of the ring shaped portion 44 toward the axial direction other-side, and is configured so as to be able to support the magnet 18 from the radial direction outside. As an example in the present exemplary embodiment, an axial direction other-end portion of the side wall portion 46 extends as far as the same position as the axial direction other-end portion of the magnet 18. The volume adjusting member 14 accordingly extends in the axial direction from the axial direction one-end portion of the yoke cover 12 as far as the yoke base 20 so as to fill a gap between the magnet 18 and the yoke cover 12.

Moreover, as illustrated in FIG. 1 and FIG. 3, a first groove portion 46A is formed in the side wall portion 46 so as to extend along the axial direction. The first groove portion 46A is formed at a position on the opposite side of the axial center to the cut out portion 42B of the yoke cover 12. Namely, the first groove portion 46A is formed at a position rotated by 180° about the axial center with respect to the cut out portion 42B of the yoke cover 12.

A projection portion 46B is provided to the side wall portion 46 so as to project out from the axial direction other-end portion of the volume adjusting member 14 toward the yoke base 20 side. The projection portion 46B is formed at a position on the opposite side of the axial center to the first groove portion 46A. Namely, the projection portion 46B is formed at a position rotated by 180° about the axial center with respect to the first groove portion 46A.

As illustrated in FIG. 1, a second groove 20A is formed to the yoke base 20 arranged at the axial direction other-side of the magnet 18. The second groove 20A is formed to an outer peripheral face of the yoke base 20, is formed as a rounded groove shape indented toward the radial direction inside, and is formed at a position corresponding to the first groove portion 46A. Namely, as illustrated in FIG. 3, the first groove portion 46A and the second groove 20A are formed so as to be contiguous to each other in the axial direction, with a duct portion D extending in the axial direction configured by the first groove portion 46A and the second groove 20A.

Inside of the yoke cover 12, a space at the axial direction one-side and a space at the axial direction other-side thereof are placed in communication with each other through the duct portion D. Namely, in cases in which a space (axial direction one-side space) at a periphery of the coil 28 is enlarged when the diaphragm 33 vibrates, air from outside the driver 10 is introduced to inside the driver 10 through the communication hole 26A, the air hole 24B, and the duct portion D. When this occurs the pressure is regulated by the mesh member 22A of the screen 22. In the opposite scenario, when the space at the periphery of the coil 28 is constricted when the diaphragm 33 vibrates, air inside the driver 10 is pushed outside the driver 10 through the duct portion D, the air hole 24B, and the communication hole 26A, and pressure is regulated.

As illustrated in FIG. 1, an engagement indentation 20B notched in a substantially rectangular shape is formed to the yoke base 20. The engagement indentation 20B is formed at a position on the opposite side of the axial center (180°) to the second groove 20A, and is formed of a size that enables the projection portion 46B of the volume adjusting member 14 to engage therewith. As illustrated in FIG. 3, in an assembled state of the driver 10, the projection portion 46B of the volume adjusting member 14 engages by entering the engagement indentation 20B of the yoke base 20, such that the yoke base 20 is suppressed from moving in a circumferential direction relative to the volume adjusting member 14.

Magnetic Circuit 11 Assembly Method

Next, description follows regarding a method of assembling the speaker magnetic circuit 11. Note that in the following description only part of a procedure to assemble the speaker magnetic circuit 11 is illustrated and described. Moreover, in the following description the top side of the page is taken as being a upward direction, and the bottom side of the page is taken as being a downward direction.

Figure 4:
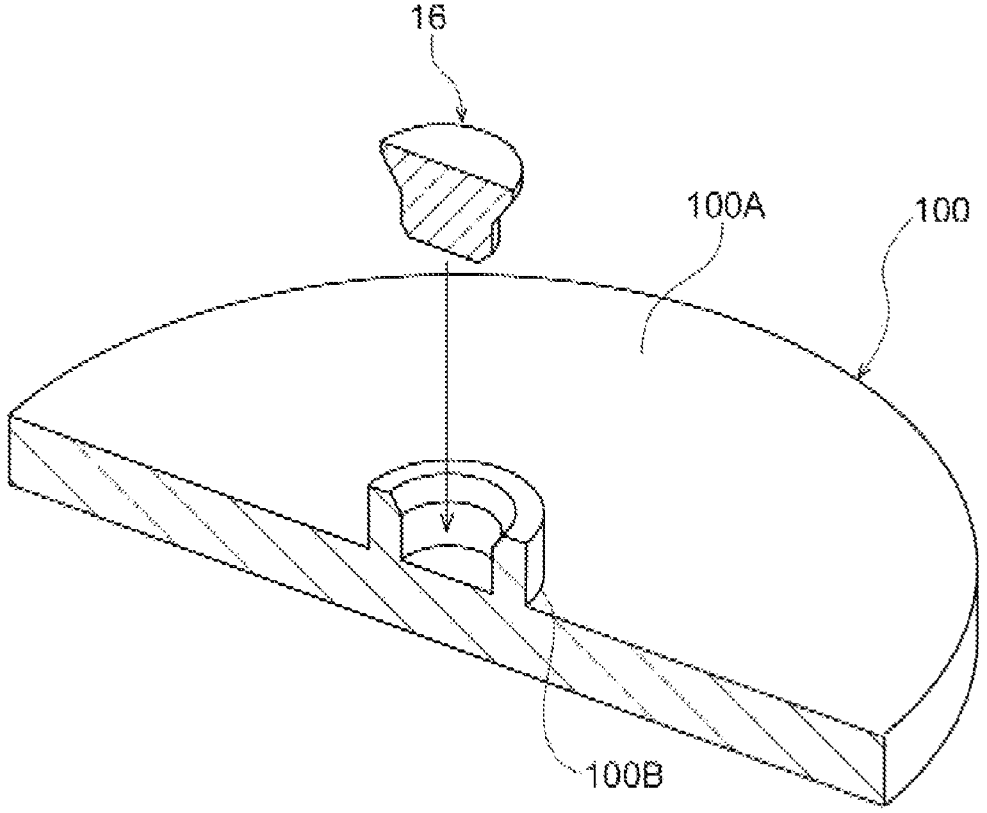
FIG. 4 is a diagram to explain a method of assembling a speaker driver according to an exemplary embodiment and illustrates a procedure for fitting a yoke top to a jig.
Figure 5:
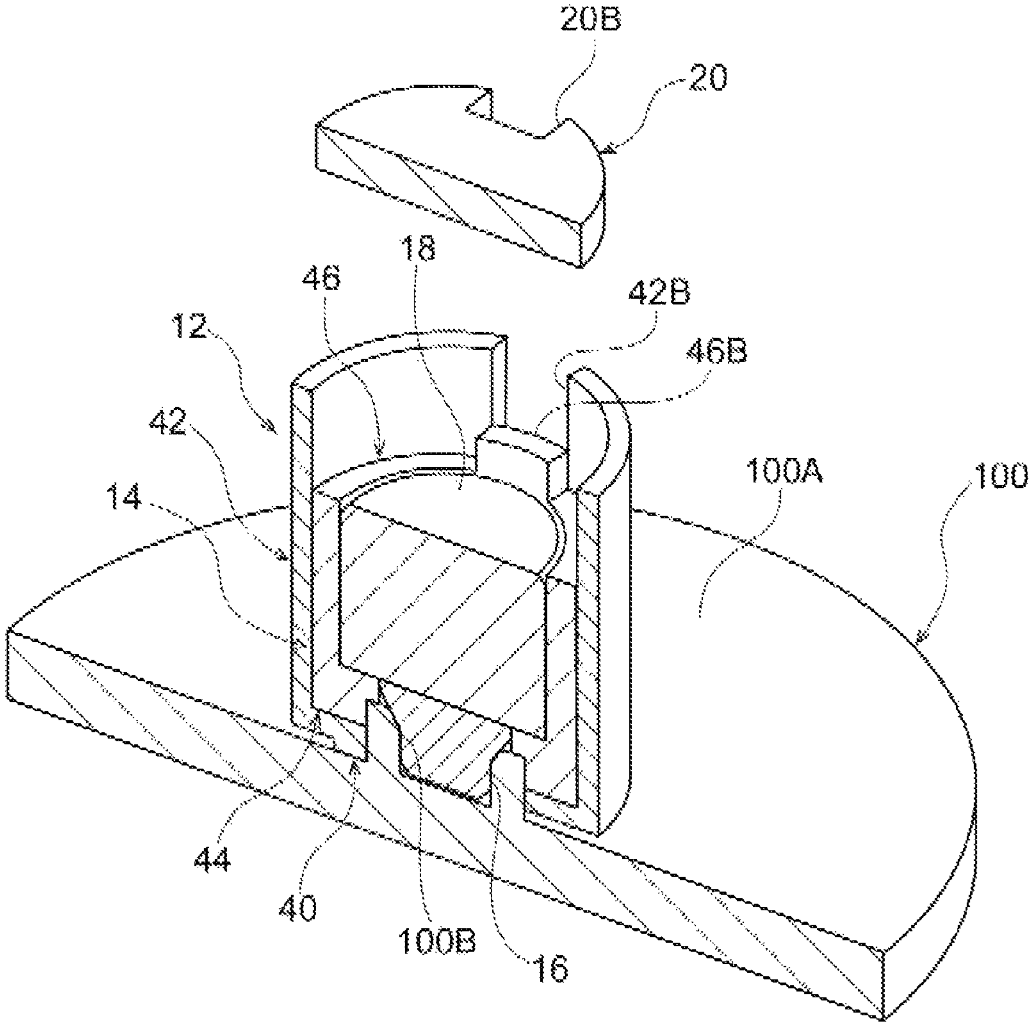
FIG. 5 is a diagram to explain a method of assembling a speaker driver according to an exemplary embodiment and illustrates a procedure for attaching a yoke base.

As illustrated in FIG. 4, at the start the yoke top 16 is fitted into a jig 100. The jig 100 is configured including a base portion 100A formed in a substantially circular plate shape, and with a circular cylinder portion 100B upstanding from a central portion of the base portion 100A. Note that for ease of explanation only half of the jig 100 is illustrated in FIG. 4 and FIG. 5. Cross-section states are also illustrated therein with similarly only half of the components configuring the driver 10 illustrated.

The yoke top 16 is fitted into the circular cylinder portion 100B of the jig 100 with the smaller diameter portion facing downward. When this is performed, for example, a taper profile is formed to an inner face at an upper end portion of the circular cylinder portion 100B and a truncated cone shaped portion of the yoke top 16 is supported thereby.

As illustrated in FIG. 5, after fitting the yoke top 16 to the jig 100, the yoke cover 12 is fitted to the jig 100. The volume adjusting member 14 is then inserted inside the yoke cover 12, and the ring shaped portion 44 of the volume adjusting member 14 is abutted against the top face portion 40 of the yoke cover 12. When this is performed, the position of the projection portion 46B of the volume adjusting member 14 is aligned with the position of the cut out portion 42B of the yoke cover 12.

The magnet 18 is then inserted inside the volume adjusting member 14, resulting in the state illustrated in FIG. 5. The yoke base 20 is then inserted inside the yoke cover 12 from this state. Configuration is such that when this is performed, the yoke base 20 is not able to be attached unless the positions of the engagement indentation 20B of the yoke base 20 and the projection portion 46B of the volume adjusting member 14 are aligned. Moreover, by aligning the positions of the engagement indentation 20B of the yoke base 20 and the projection portion 46B of the volume adjusting member 14, the positions of the second groove 20A formed at the opposite side to the engagement indentation 20B and the first groove portion 46A of the volume adjusting member 14 are also aligned (see FIG. 1).

After the yoke base 20 has been inserted inside the yoke cover 12, as illustrated in FIG. 2, the metal plate 24 with the screen 22 attached thereto is fitted to the yoke cover 12. This thereby results in a state in which the axial direction other-side of the yoke cover 12 is closed off by the metal plate 24.

After the metal plate 24 has been fitted and the speaker magnetic circuit 11 assembled, the terminal 26 is bonded to the axial direction other-side of the speaker magnetic circuit 11, and the diaphragm unit 30 with the coil 28 attached thereto and the lid member 32 are attached to the axial direction one-side of the speaker magnetic circuit 11.

Operation

Next, description follows regarding the operation of the present exemplary embodiment.

The yoke base 20 is provided at the axial direction other-side of the magnet 18 in the speaker driver 10 according to the present exemplary embodiment, thereby enabling the magnetic flux density of the magnetic circuit to be raised. Namely, a magnetic flux density can be secured even with a compact driver 10.

Moreover as illustrated in FIG. 3, in the present exemplary embodiment the volume adjusting member 14 is provided between the yoke cover 12 and the magnet 18. This thereby enables the volume inside the driver 10 to be freely regulated, while still maintaining an appropriate gap between the yoke cover 12 and the magnet 18.

The first groove portion 46A is formed to the side wall portion 46 of the volume adjusting member 14 so as to extend in the axial direction. The second groove 20A is formed to the yoke base 20 at a position corresponding to the first groove portion 46A, with the first groove portion 46A and the second groove 20A configuring the duct portion D. The air at the periphery of the diaphragm 33 is accordingly able to move to the outside of the yoke base 20 through the duct portion D when the diaphragm 33 vibrates, thereby enabling frequency characteristics to be adjusted. For example, acoustic control can be performed using the duct portion D to raise or lower the sound pressure of a specific frequency. Moreover, foreign matter can be suppressed from intruding inside the driver 10 by the mesh member 22A of the screen 22.

In particular, in the present exemplary embodiment the projection portion 46B formed to the volume adjusting member 14 is engaged with the engagement indentation 20B formed to the yoke base 20. This thereby enables relative movement between the volume adjusting member 14 and the yoke base 20 to be suppressed from occurring in the circumferential direction even without mechanically joining the two components together, enabling good performance of the duct portion D to be maintained. Note that due to the second groove 20A and the engagement indentation 20B being formed in the yoke base 20 of the present exemplary embodiment with different shapes to each other, the yoke base 20 is not able to be assembled with the wrong orientation during assembly of the speaker magnetic circuit 11.

Furthermore, due to the volume adjusting member 14 extending in the axial direction as far as the yoke base 20 in the present exemplary embodiment, the volume inside the yoke cover 12 can be adjusted merely by changing the shape and/or size of the first groove, enabling the lowest resonance frequency (F0) to be easily adjusted. For example, the volume inside the yoke cover 12 can be reduced by adjusting the first groove of the volume adjusting member 14. Lowering of the lowest resonance frequency (F0) can be suppressed as a result thereof. Moreover, the volume inside the yoke cover 12 can be finely regulated merely by changing the shape of the volume adjusting member 14, enabling a desired lowest resonance frequency (F0) to be obtained.

Furthermore, in the present exemplary embodiment the ring shaped portion 44 of the volume adjusting member 14 supports the yoke top 16, and the side wall portion 46 of the volume adjusting member 14 supports the magnet 18. This thereby enables a large misalignment between the axial centers of the yoke top 16 and the magnet 18 to be suppressed from occurring. Namely, positioning of the yoke top 16 and the magnet 18 can be performed without providing a separate member for positioning.

Moreover, as illustrated in FIG. 2, in the present exemplary embodiment the upstand portion 40B formed to the top face portion 40 of the yoke cover 12 projects further toward the axial direction one-side than the yoke top 16. This accordingly results in magnetic field lines passing through obliquely from the yoke top 16 toward the upstand portion 40B, enabling the magnetic flux density of the speaker magnetic circuit 11 to be raised. The axial direction positioning between the yoke top 16 and the yoke cover 12 can be performed by the volume adjusting member 14, enabling the magnetic field lines to flow in a desired direction. Furthermore, the position of the yoke top 16 is a position relatively on the axial direction other-side with respect to the yoke cover 12, enabling a wide gap to be secured between the yoke top 16 and the diaphragm 33. The diaphragm 33 can accordingly be effectively suppressed from interfering with the yoke top 16. The beveled portion 16A is formed to the leading end of the yoke top 16 in the present exemplary embodiment, enabling adhesive employed when bonding the coil 28 to the diaphragm 33 to be suppressed from interfering with the yoke top 16.

Note that although the first groove portion 46A is formed in the volume adjusting member 14 only at a single location in the present exemplary embodiment, there is no limitation thereto. For example, structures of modified examples illustrated in FIG. 6 and FIG. 7 may be adopted.

First Modified Example

Figure 6:
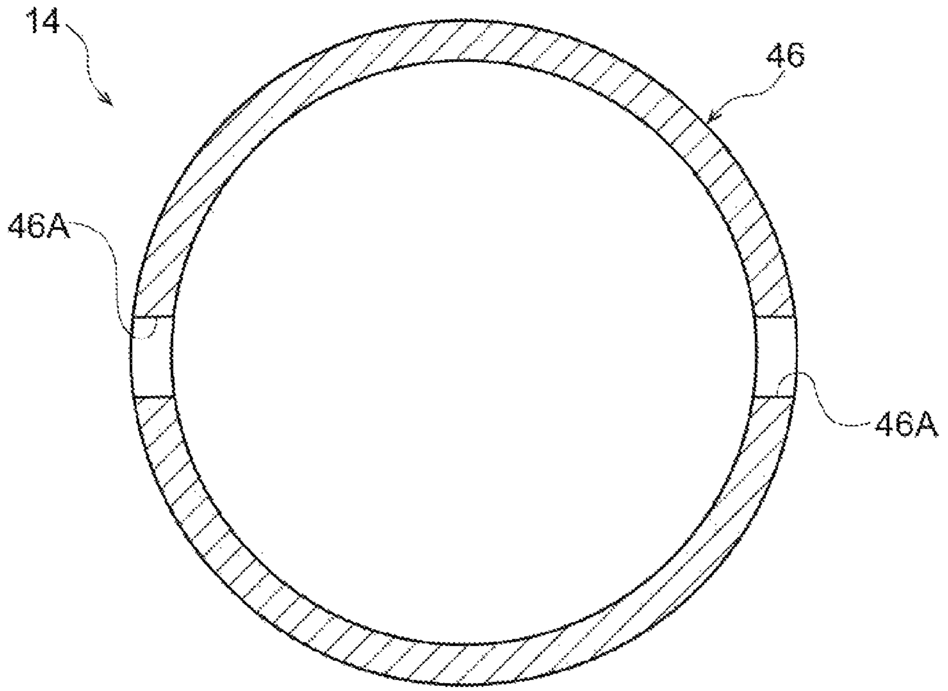
FIG. 6 illustrates a first modified example of a volume adjusting member in a cross-section as viewed from an axial direction.

As illustrated in FIG. 6, in the first modified example there are two first groove portions 46A formed to the side wall portion 46 of the volume adjusting member 14. The first groove portions 46A are formed at positions on opposite sides (at 180°) about the axial center. Namely, the two first groove portions 46A are formed at uniform intervals in the circumferential direction.

Moreover, although not illustrated, there are also second grooves 20A formed to the yoke base 20 at respective positions corresponding to the two first groove portions 46A. This means that there are two duct portions D formed in the present modified example.

Second Modified Example

Figure 7:
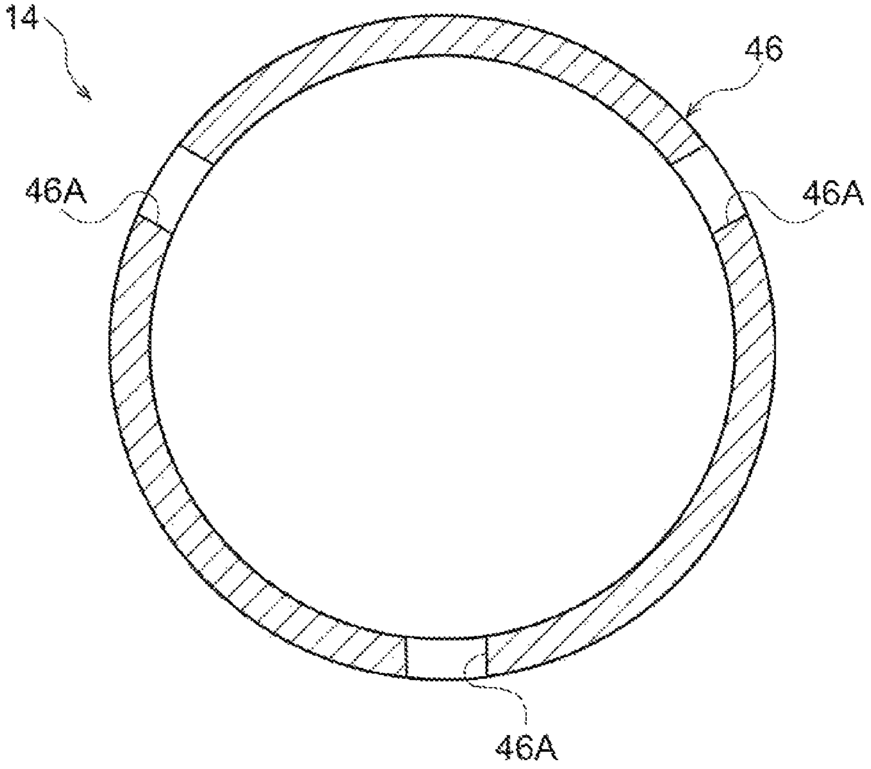
FIG. 7 illustrates a second modified example of a volume adjusting member in a cross-section as viewed from an axial direction.

As illustrated in FIG. 7, there are three first groove portions 46A formed to the side wall portion 46 of the volume adjusting member 14 in the second modified example. The first groove portions 46A are formed at positions at 120° from each other about the axial center. Namely, the three first groove portions 46A are formed at uniform intervals in the circumferential direction.

Moreover, although not illustrated, there are also second grooves 20A formed to the yoke base 20 at respective positions corresponding to the three first groove portions 46A. There are accordingly three duct portions D formed in the present modified example.

By increasing the number of the first groove portions 46A in the first modified example and the second modified example as described above from those of the exemplary embodiment, the first groove portions 46A are formed at uniform intervals in the circumferential direction, with this resulting in uniform flow of air, and enabling vibration of the diaphragm 33 to be stabilized.

Supplementary Explanation

Although the driver 10 and the speaker magnetic circuit 11 according to an exemplary embodiment have been described above, obviously various embodiments may be implemented within a range not departing from the spirit of the present disclosure. For example, although the beveled portion 16A is formed to the yoke top 16 in the above exemplary embodiment as illustrated in FIG. 2, there is no limitation thereto. A beveled portion 16A may be omitted from being formed to the yoke top 16 in cases in which the diaphragm 33 and the adhesive of the diaphragm 33 would not interfere with the yoke top 16.

Moreover, although in the exemplary embodiment described above the upstand portion 40B of the yoke cover 12 projects out further toward the axial direction one-side than the yoke top 16, in a configuration in which magnetic field lines are oriented obliquely from the vicinity of the beveled portion 16A of the yoke top 16 toward the upstand portion 40B, there is no limitation thereto. For example, an axial direction one-end portion of the upstand portion 40B and an axial direction one-end portion of the yoke top 16 may be at the same position. Such cases are a configured with the magnetic field lines oriented in a radial direction from the yoke top 16 toward the upstand portion 40B.

Furthermore, although in the above exemplary embodiment the length of the side wall portion 46 of the volume adjusting member 14 is set to a length so as to cover the magnet 18 entirely, there is no limitation thereto. For example, the side wall portion 46 may be formed shorter in the axial direction than the configuration illustrated in FIG. 2. In such cases, the axial direction other-end portion of the side wall portion 46 can be suppressed from projecting out further toward the axial direction other-side than the magnet 18 due to design tolerances or the like, enabling a good contact state to be maintained between the magnet 18 and the yoke base 20.

Furthermore, although in the exemplary embodiment described above the first groove portion 46A is formed as a substantially slit shape in the side wall portion 46 of the volume adjusting member 14, there is no limitation thereto, and the first groove portion 46A may be formed in another shape. For example, the first groove portion 46A may be formed so as to indent the side wall portion 46 toward the radial direction outside. The duct portion D can be configured from the first groove portion 46A and the second groove 20A in such cases too.

The entire content of the disclosure of Japanese Patent Application No. 2021-030902 is incorporated by reference in the present specification.

All publications, patent applications and technical standards mentioned in the present specification are incorporated by reference in the present specification to the same extent as if each individual publication, patent application, or technical standard was specifically and individually indicated to be incorporated by respect.

The invention claimed is:

1. A speaker magnetic circuit comprising:

a yoke cover that is formed from a tubular magnetic body with a diaphragm attachable to an end portion on an axial direction one-side;

a magnet arranged at an inside of the yoke cover;

a volume adjusting member that is formed from a tubular non-magnetic body, that is provided between the yoke cover and the magnet, and that is formed with a first groove extending in an axial direction; and a yoke base that is formed from a magnetic body, that is provided at an axial direction other-side of the magnet, and that is formed with a second groove at a position corresponding to the first groove, wherein:

the first groove and the second groove configure a duct portion that communicates a space inside the yoke cover at the axial direction one-side with a space at the axial direction other-side therein.

2. The speaker magnetic circuit of claim 1, wherein the volume adjusting member extends in the axial direction, from an axial direction one-end portion of the yoke cover to the yoke base, so as to fill a gap between the magnet and the yoke cover.

3. The speaker magnetic circuit of claim 1, wherein:

a projection portion is provided at the volume adjusting member so as to project from an axial direction other-end portion thereof toward a yoke base side; and an engagement indentation for engaging with the projection portion is formed to the yoke base.

4. The speaker magnetic circuit of claim 1, wherein:

a yoke top formed from a magnetic body with a smaller diameter than a diameter of the magnet is provided at an axial direction one-side of the magnet; and the volume adjusting member includes a ring shaped portion that is formed in a ring shape and is able to support the yoke top from a radial direction outer side, and a side wall portion that extends from a peripheral end portion of the ring shaped portion toward an axial direction other-side and that is able to support the magnet from the radial direction outer side.

5. The speaker magnetic circuit of claim 4, wherein:

the yoke cover includes a top face portion abutted by the ring shaped portion of the volume adjusting member, and a side wall portion that extends in the axial direction from a peripheral end portion of the top face portion and that covers the volume adjusting member from the radial direction outside; and the top face portion is formed with an opening portion through which the yoke top is inserted, and with an upstand portion that projects from an opening edge of the opening portion further toward the axial direction one-side than the yoke top.

6. A speaker driver comprising:

the speaker magnetic circuit of claim 1;

a diaphragm provided at an axial direction one-end portion of the yoke cover; and a coil that is attached to the diaphragm and that causes the diaphragm to vibrate by current being passed through the coil.

* * * * *